(12) United States Patent
Jeon et al.

(10) Patent No.: US 7,943,709 B2
(45) Date of Patent: May 17, 2011

(54) COPOLYMER COMPRISING ALKENE, ACRYLATE AND UNSATURATED ORGANIC ACID, AND METHOD FOR PREPARING THE SAME

(75) Inventors: Byoung-Ho Jeon, Daejeon Metropolitan (KR); Yoo-Young Jung, Ansan-si (KR); Ki-Su Ro, Daejeon Metropolitan (KR); Kyung-Seop Noh, Daejeon Metropolitan (KR); Bae-Kun Shin, Incheon Metropolitan (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/593,953

(22) PCT Filed: Mar. 28, 2008

(86) PCT No.: PCT/KR2008/001750
§ 371 (c)(1),
(2), (4) Date: Mar. 2, 2010

(87) PCT Pub. No.: WO2008/120912
PCT Pub. Date: Oct. 9, 2008

(65) Prior Publication Data
US 2010/0197872 A1    Aug. 5, 2010

(30) Foreign Application Priority Data
Mar. 30, 2007  (KR) .................. 10-2007-0031572

(51) Int. Cl.
C08F 2/00 (2006.01)
C08F 20/06 (2006.01)
C08F 118/02 (2006.01)
C08F 220/10 (2006.01)
C08F 222/04 (2006.01)

(52) U.S. Cl. ......... 526/90; 526/317.1; 526/319; 526/89; 526/329; 526/329.1; 526/329.2; 526/318.45; 526/272; 526/221

(58) Field of Classification Search ............... 526/317.1, 526/319, 89, 90, 329, 318.45, 329.1, 329.2, 526/272, 221
See application file for complete search history.

(56) References Cited

U.S. PATENT DOCUMENTS

| | | | |
|---|---|---|---|
| 2,728,754 A | 12/1955 | Evering et al. | |
| 2,818,407 A | 12/1957 | Aldrich | |
| 2,953,551 A | 9/1960 | White | |
| 3,183,217 A * | 5/1965 | Serrniuk et al. | 526/221 |
| 3,350,372 A | 10/1967 | Anspon et al. | |
| 3,496,217 A | 2/1970 | Drinkard, Jr. et al. | |
| 3,496,218 A | 2/1970 | Drinkard | |
| 3,496,271 A | 2/1970 | Drinkard, Jr. | |
| 3,596,218 A | 7/1971 | Layton | |
| 3,773,808 A | 11/1973 | Wesselman | |
| 3,773,809 A | 11/1973 | Walter | |
| 3,900,674 A | 8/1975 | Coffman | |
| 3,956,248 A | 5/1976 | Logothetis | |
| 3,959,225 A | 5/1976 | Kuntz | |
| 4,001,159 A | 1/1977 | Imai et al. | |
| 4,122,248 A | 10/1978 | Pfleger et al. | |
| 4,307,211 A | 12/1981 | Ito et al. | |
| 4,774,353 A | 9/1988 | Hall et al. | |
| 4,874,884 A | 10/1989 | McKinney et al. | |
| 5,041,664 A | 8/1991 | Su | |
| 5,210,166 A | 5/1993 | Ziegler et al. | |
| 5,281,651 A | 1/1994 | Arjunan et al. | |
| 5,376,739 A | 12/1994 | Pfleger et al. | |
| 5,376,740 A | 12/1994 | Pfleger et al. | |
| 5,543,477 A | 8/1996 | Latiolais et al. | |
| 6,127,567 A | 10/2000 | Garner et al. | |
| 6,171,996 B1 | 1/2001 | Garner et al. | |
| 6,380,421 B1 | 4/2002 | Lu et al. | |
| 7,091,293 B2 | 8/2006 | Kuwahara et al. | |
| 7,629,423 B2 | 12/2009 | Jung et al. | |
| 2002/0156207 A1 | 10/2002 | Imuta et al. | |
| 2003/0060577 A1 | 3/2003 | Benicewicz et al. | |
| 2005/0020775 A1 | 1/2005 | Wu et al. | |
| 2005/0277569 A1 | 12/2005 | Goodall et al. | |
| 2006/0100403 A1 | 5/2006 | Yoon et al. | |

FOREIGN PATENT DOCUMENTS

| | | | |
|---|---|---|---|
| EP | 0283972 A2 | | 9/1988 |
| EP | 283972 A2 | * | 9/1988 |
| EP | 0442476 A2 | | 8/1991 |
| JP | 2-308803 A | | 12/1990 |
| JP | 3-203949 A | | 9/1991 |
| JP | 2004277473 A | | 10/2004 |
| WO | 2007021798 A1 | | 2/2007 |

OTHER PUBLICATIONS

International Search Report, PCT/KR2008/001750, dated Jun. 30, 2008.

* cited by examiner

Primary Examiner — Michael M Bernshteyn
(74) Attorney, Agent, or Firm — Lerner, David, Littenberg, Krumholz & Mentlik, LLP

(57) ABSTRACT

The present invention provides a copolymer that includes at least one alkene monomer, at least one acrylate monomer and at least one the unsaturated organic acid monomer having one or more double bonds, and a method of manufacturing the same.

4 Claims, 6 Drawing Sheets

COPOLYMER COMPRISING ALKENE, ACRYLATE AND UNSATURATED ORGANIC ACID, AND METHOD FOR PREPARING THE SAME

CROSS-REFERENCE TO RELATED APPLICATIONS

The present application is a national phase entry under 35 U.S.C. §371 of International Application No. PCT/KR2008/001750, filed Mar. 28, 2008, published in English, which claims priority from Korean Patent Application No. 10-2007-0031572, filed Mar. 30, 2007, the disclosures of which are incorporated herein by reference.

TECHNICAL FIELD

The present invention relates to a novel copolymer and a method of manufacturing the same. More particularly, the present invention relates to a novel copolymer that has the excellent transparency, adhesion property and heat resistance and can be applied to various types of optical materials, and a method of manufacturing the same.

BACKGROUND ART

In the case of when 1-alkene, in particular, ethylene is subjected to the copolymerization in conjunction with an alkyl(meth)acrylate comonomer, a polymer that has physical properties different from those of typical polyethylene may be formed. For example, the adhesion strength, properties such as the low temperature toughness and the like may be significantly improved as the content of comonomer(s) is increased. Accordingly, the much development of the copolymer including 1-alkene and the other comonomers mixed with each other has been made.

In a related art, the copolymer of ethylene and alkyl acrylate or ethylene and alkyl methacrylate is obtained by using the high temperature and high pressure reaction. Thus, the reaction by simultaneously adding ethylene and an acryl monomer by using a tube type of reactor or an autoclave reactor under the severe condition of 1000 atm or more and 100° C. or more is disclosed. The polymer that is obtained under this condition is a copolymer polymerized by using the acryl monomer that is the polar monomer in an amount of 3 to 35% based on ethylene.

However, in order to ensure the high temperature and high pressure condition, an additional apparatus such as a primary compressor, a secondary compressor, and a special reactor is required to ensure safety of operators. In addition, due to the severe process condition, there are many condition limits when the composition of the copolymer is to be changed in a desired direction.

In addition, the ethylene copolymer that is manufactured by using a known method includes few polar groups. That is, since the content of polar monomer is not high, the crystallinity of polyethylene remains in the copolymer. Thus, there is a limit in use of the copolymer in an optical material such as a transparent film. Accordingly, in respects to the polymer that is obtained according to the known high temperature and high pressure method by using tube type of reactor or autoclave, products that do not affect the transparency have been mainly developed.

Accordingly, there is a need to develop a novel method of manufacturing a polar copolymer that has no crystallinity due to the high content of polar comonomer without the high temperature and high pressure severe polymerization condition.

Meanwhile, a method of copolymerizing vinyl monomers in olefin by using a metal complex compound catalyst is known. However, due to the high affinity in respects to oxygen of the metal, the metal complex compound catalyst on the basis of an initial transition metal and a lanthanide metal is disadvantageous in that the catalyst is easily contaminated by a functional group (C═O) of the polar vinyl monomer. In respects to a metal complex compound catalyst system on the basis of a latter transition metal, the high possibility of the copolymerization of alkyl acrylate and olefin is reported, but the content of olefin is still very high.

In order to overcome the disadvantage of the metal complex compound catalyst polymerization method in which the metal complex compound catalyst is contaminated due to oxygen that is present in the polar group, thus redwing the activity and forming a polymer having the low content of polar groups, the controlled radical polymerization has been suggested. In the case of when olefin and the polar vinyl monomers are subjected to the copolymerization by using the ATRP (Atom Transfer Radical Polymerization) that is the representative method of the controlled radical polymerization, the content of the polar vinyl monomer is higher than the content of olefin unlike the metal complex compound catalyst polymerization. That is, it is possible to synthesize a random copolymer in which the content of olefin is appropriately controlled according to the polymerization condition. However, in the case of when the ATRP is used, a long time is required to obtain the high molecular weight, and there is a limit in maintaining the content of olefin at a low level. Since the 1-alkene-acrylate copolymer has the high transparency, the copolymer is usefully applied to an optical material. However, in order to use the copolymer for the above purpose, the excellent heat resistance must be ensured so as to prevent deformation due to heat generated during the manufacturing process and the operation of optical apparatuses. Accordingly, there is a need to develop a novel copolymer in order to improve the physical properties such as the heat resistance and the like.

Japanese Unexamined Patent Application Publication No. 3-203949 (publication date: Sep. 5, 1991) discloses a conductive resin composition that includes an ethylene acrylic acid elastomer and a conductive filling agent. In connection with this, specific examples of the ethylene acrylic acid elastomer that is used as a binder may include a copolymer that consists of an ethylene repeating unit, an acrylic acid methyl repeating unit, and an alkylene organic acid repeating unit. The patent discloses that since the copolymer can be commercially obtained as the trademark of Bemack manufactured by Sohwa Industry DuPont, Co., Ltd., the purchase of the copolymer is easy, but not the specific content ratio of monomers.

Japanese Unexamined Patent Application Publication No. 2-308803 (publication date: Dec. 21, 1990) discloses a method of manufacturing an ethylene-unsaturated carboxylic acid copolymer, in which ethylene and unsaturated carboxylic acid ester are subjected to the copolymerization in the presence of a Lewis acid using a catalyst that includes a chrome compound and an organic metal compound as main components to obtain an ethylene-unsaturated carboxylic acid ester copolymer and the copolymer is subjected to the heat treatment at a temperature in the range of 80 to 150° C. In connection with this, the amount of unsaturated carboxylic acid ester that is used to manufacture the ethylene-unsaturated carboxylic acid ester copolymer is in the range of 0.001 to 45 mole %. The unsaturated carboxylic acid ester repeating unit may be completely or partially converted into an unsaturated carboxylic acid repeating unit by using the heat treatment. Thus, this patent discloses that the ethylene-unsaturated carboxylic acid ester-unsaturated carboxylic acid three-membered copolymer may be generated. In connection with this, this patent discloses that the content of the unsaturated carboxylic acid and unsaturated carboxylic acid ester repeating unit is in the range of 0.001 to 45 mole %, and the content ratio of the unsaturated carboxylic acid repeating unit is in the range of 0.31 to 1 and preferably 0.4 to 1 based on the total content of the unsaturated carboxylic acid and unsaturated carboxylic acid ester repeating unit.

DISCLOSURE OF INVENTION

Technical Problem

It is an object of the present invention to provide a copolymer that has an amorphous property due to the high content of polar monomers, excellent transparency, adhesion property, and heat resistance, and high adhesion property in respects to the material such as metal. It is another object of the present invention to provide a method of manufacturing a copolymer, in which the polymerization is performed by using an appropriate amount of comonomers used to ensure the physical properties required under the mild reaction condition, a catalyst can be recovered and reused to ensure economic efficiency, and the impurity in the polymer is minimized.

Technical Solution

In order to accomplish the above objects, the present invention provides a copolymer that includes 0.1 to 30 mole % of at least one alkene monomer, 30 to 99 mole % of at least one acrylate monomer, and 0.1 to 50 mole % of at least one unsaturated organic acid monomer having one or more double bonds.

In addition, the present invention provides a method of manufacturing a copolymer, which includes polymerizing at least one alkene monomer 0.1 to 30 mole %, at least one acrylate monomer 30 to 99 mole % and at least one the unsaturated organic acid monomer having one or more double bonds 0.1 to 50 mole % in the presence of a Lewis acid or a metal oxide by using a radical polymerization initiator.

ADVANTAGEOUS EFFECTS

A copolymer according to the present invention is an amorphous polymer that has the high content of polar group, and has the excellent transparency. Since the copolymer includes an unsaturated organic acid such as an acrylic acid, the adhesion property and the heat resistance are improved, and the copolymer can be applied as various types of optical materials. In addition, in a method of manufacturing a copolymer according to the present invention, since a Lewis acid or a metal oxide is used, the polymerization can be performed by using an appropriate amount of alkene monomers used to ensure the physical properties required under the mild reaction condition, in the case of when the metal oxide, the metal oxide can be recovered and reused to ensure economic efficiency, and a problem regarding the impurity in the polymer can be solved. Accordingly, it is possible to manufacture the polymer having the high purity.

BEST MODE FOR CARRYING OUT THE INVENTION

Figure 1:
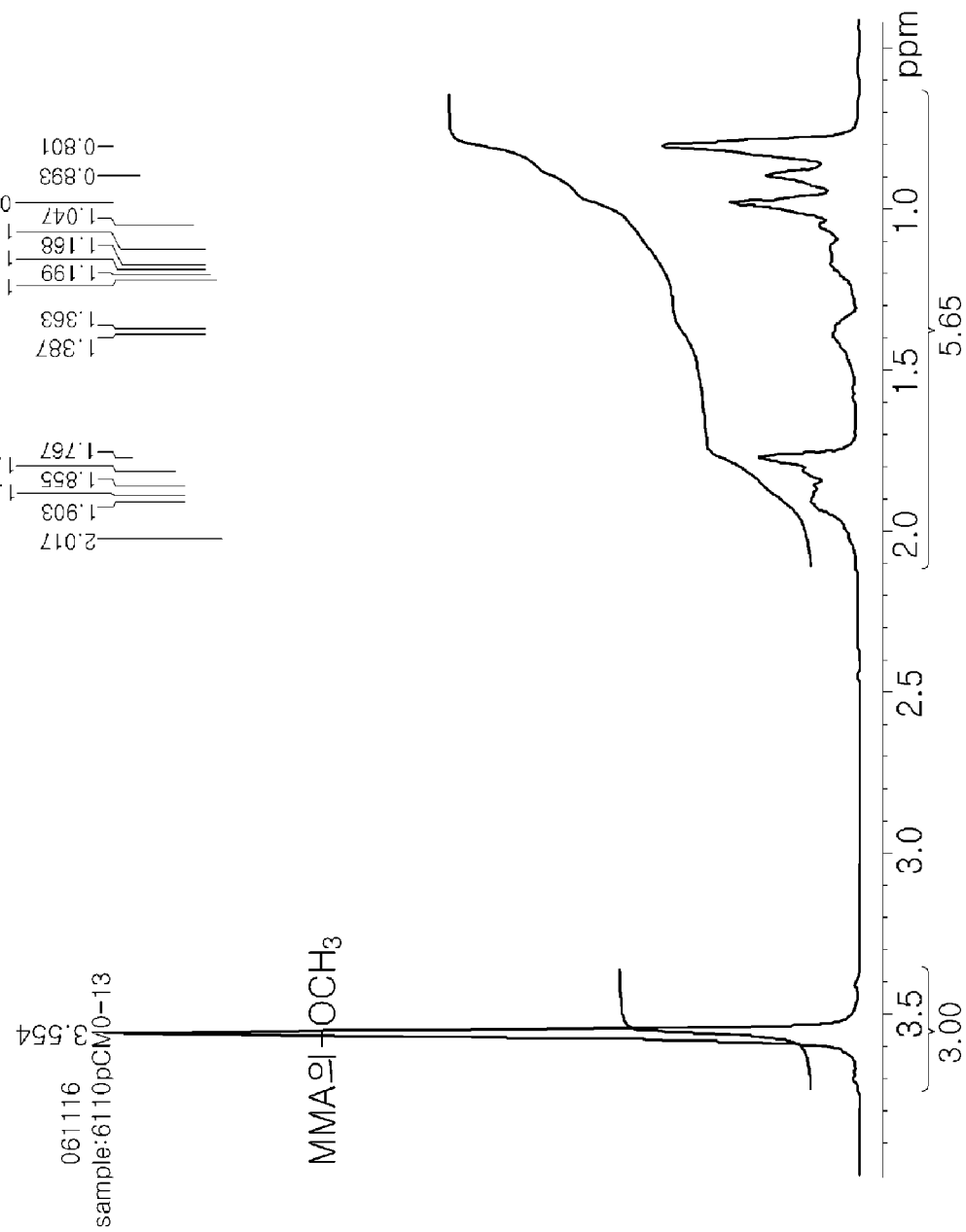
FIG. 1 illustrates a hydrogen nuclear magnetic resonance spectrum ($^1$H-NMR spectrum) of an ethylene-methyl methacrylate copolymer that is obtained in Comparative Example 1.

Hereinafter, the present invention will be described in detail.

A copolymer according to the present invention includes an alkene monomer, an acrylate monomer, and an unsaturated organic acid monomer having one or more double bonds. In the present invention, it is preferable that the contents of the alkene monomer, the acrylate monomer and the unsaturated organic acid monomer having one or more double bonds be 0.1 to 30 mole %, 30 to 99 mole %, and 0.1 to 50 mole % respectively.

In the present specification, the inclusion of the alkene monomer, acrylate monomer and the unsaturated organic acid monomer having one or more double bonds in the copolymer according to the present invention means that the copolymer according to the present invention is formed by polymerizing the monomers. For convenience of the understanding, the terms of the monomers are used to express the structures thereof. It can be easily understood by those who skilled in the art that the double bonds of the monomers are not present at the main chain of the copolymer according to the present invention.

The glass transition temperature (Tg) of the copolymer according to the present invention is in the range of 80 to 220° C. and preferably 100 to 220° C. In order to effectively use the copolymer as an optical material, it is preferable that the glass transition temperature be 100° C. or more. In addition, it is preferable that the copolymer according to the present invention have a number average molecular weight in the range of 5,000 to 400,000 and a weight average molecular weight in the range of 10,000 to 800,000. In addition, it is preferable that the copolymer according to the present invention have a temperature at which an initial weight is reduced by half ($Td_{50}$) in the range of 300 to 550° C.

In the present invention, examples of the alkene monomer include, but are not limited to alkenes such as 1-alkene that has a double bond at an end of a carbon chain thereof, 2-alkene and 3-alkene that has a double bond at a middle part of a carbon chain thereof, and the like.

Examples of 1-alkene may include ethylene, propylene, 1-butene, 1-pentene, 1-hexene, 1-hepthene, 1-octene, 1-nonen, 1-decene and the like. Examples of alkene that has the double bond at the middle part of the carbon chain thereof may include 2-butene, 2-pentene, 2-hexene, 3-hexene, 2-hepthene, 2-octene, 2-nonen and the like.

In the copolymer, the content of the alkene monomer is in the range of 0.1 to 30 mole % and preferably 10 to 30 mole %. In the case of when the polymer includes only the monomers having the polar group without the alkene monomer, there is a problem in that the formed film is easily broken. In particular, if the content of the alkene monomer in the copolymer is 10 mole % or more, the polymer is not easily broken when the monomer is applied to the layered film of the optical material. However, the alkene monomer may be included in an amount of less than 10 mole % in respects to products that do not require the nonbreaking.

In the present invention, the acrylate monomer may be a compound having a double bond between conjugated carbons and carbonyl group of an ester group, and a substituent group thereof is not limited. In the present specification, it is to be understood that the term "acrylate monomer" means acrylate and an acrylate derivative, and includes alkyl acrylate, alkyl methacrylate, alkyl butacrylate and the like.

Specifically, examples of the acrylate monomer include a compound that is represented by the following Formula 1.

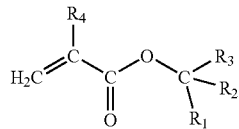

[Formula 1]

In Formula 1, $R_1$, $R_2$ and $R_3$ are the same or different from each other, and are each independently a hydrogen atom or a monovalent hydrocarbon group that is capable of including a hetero atom and has 1 to 30 carbon atoms, at least one of $R_1$, $R_2$ and $R_3$ may be an epoxy group, and $R_4$ is a hydrogen atom or an alkyl group having 1 to 6 carbon atoms.

In Formula 1, examples of the acrylate monomer in which at least one of $R_1$, $R_2$ and $R_3$ is an epoxy group include glycidyl methacrylate and glycidyl acrylate. In addition, examples of the acrylate monomer include alkyl acrylate including a straight- or branched-chained alkyl group having 1 to 12 carbon atoms, alkyl methacrylate including a straight- or branched-chained alkyl group having 1 to 12 carbon atoms, or alkyl butacrylate including a straight- or branched-chained alkyl group having 1 to 12 carbon atoms.

It is preferable that the content of the acrylate monomer in the copolymer be in the range of 30 to 99 mole %, preferably 35 to 99 mole % or 40 to 99 mole %, more preferably 50 to 99 mole % or 50 to 95 mole %, and most preferably 50 to 90 mole %.

In the case of when the content of the acrylate comonomer that is the polar monomer is increased, the crystallinity that is the intrinsic physical property of alkene, particularly 1-alkene such as ethylene, can be prevented. Thus, it is possible to produce an amorphous copolymer. It is difficult to manufacture the amorphous 1-alkene-acrylate copolymer by using a known technology. Since the amorphous copolymer has the high transparency and the excellent adhesion property, it is possible to use the amorphous copolymer as the optical material. In particular, since the amorphous copolymer has many polar functional groups, the copolymer has the excellent adhesion strength in respects to metal or the like. Thus, the copolymer is useful to apply electric devices.

In the above reaction, in the case of when the amount of the acrylate monomer is less than 30 mole % based on the total amount of the monomers, the adhesion property and the transparency are poor. In the case of when the amount of the acrylate comonomer is more than 99 mole %, there is a problem in that the polymer is easily broken. In addition, in order to apply the copolymer to a layered film for optical materials, the amount of the acrylate monomer is preferably 95 mole % or less and more preferably 90 mole % or less so as to reduce the breaking property during the formation of the film.

In the present invention, the unsaturated organic acid monomer has one or more double bonds and can be used to perform radical polymerization by using the double bond. In particular, it is to be understood that even though there is no mention regarding the unsaturated organic acid monomer having one or more double bonds in the specification, the unsaturated organic acid monomer has one or more double bonds unless otherwise specified.

It is preferable that the unsaturated organic acid monomer have one or more carboxylic rids. The unsaturated organic acid monomer is more preferably an unsaturated carboxylic acid compound having a double bond between conjugated carbons and the carboxylic group. The substituent groups thereof are not limited. Specific examples of the unsaturated organic acid monomer include, but are not limited to monovalent or polyvalent carboxylic rids such as a monovalent carboxylic acid such as an acrylic acid, a divalent carboxylic acid such as a maleic acid and the like.

In the case of when the unsaturated organic acid monomer is the acrylic acid, the acrylic acid is preferably an acrylic acid compound that is represented by the following Formula 2. However, another acrylic acid derivatives such as an alkyl methacrylic acid may be used.

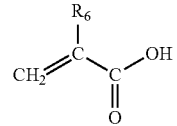

[Formula 2]

In Formula 2, $R_6$ is a hydrogen atom or an alkyl group having 1 to 6 carbon atoms.

Examples of the divalent carboxylic acid may include a maleic acid, a maleic acid derivative substituted with at least one alkyl group.

In the copolymer according to the present invention, the content of the unsaturated organic acid monomer is in the range of 0.1 to 50 mole %, and preferably 0.1 to 30 mole %. If the unsaturated organic acid monomer is introduced as a component of the copolymer, the copolymer has a high glass transition temperature and the excellent adhesion property due to the hydrophilic functional group. Thus, copolymer may be used as the optical material. In particular, since the copolymer has many polar functional groups, the copolymer has the excellent adhesion strength in respects to metal or the like. Thus, the copolymer is useful to apply electric devices.

The copolymer that consists of the repeating units of the above-mentioned monomers may include a repeating unit that is represented by the following Formula 3.

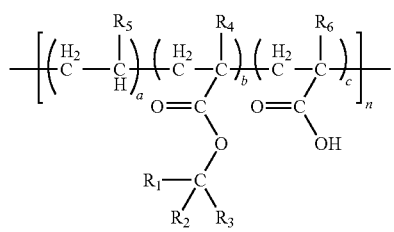
[Formula 3]

In Formula 3, a, b and c are molar ratios, all of a, b and c are not 0, $R_1$ to $R_4$ and $R_6$ are the same as those of the above, and $R_5$ is a hydrogen atom or an alkyl group having 1 to 6 carbon atoms.

The copolymer according to the present invention may be a random copolymer. In this case, the copolymer according to the present invention may include various types of repeating units that are represented by Formula 3. In addition, the copolymer may include a block or blocks as long as the transparency is maintained. It is preferable that the copolymer according to the present invention have the transparency of 80% or more during the formation of the film.

Since the copolymer according to the present invention has the high content of polar group, there is no crystallinity in alkene such as ethylene. Thus, after the a polymer film is formed by using the copolymer according to the present invention, the copolymer is transparent. Additionally, since the copolymer includes the unsaturated organic acid such as the acrylic acid, the copolymer has the high glass transition temperature and the improved adhesion property and preferably used for a polarizing plate and an optical film having a multilayered structure.

In addition, the alkene-acrylate-unsaturated organic acid copolymer according to the present invention may include one type of alkene, one type of acrylate, and one type of unsaturated organic acid as the monomer component, and two or more of alkene, acrylate and unsaturated organic acid. Additionally, within the range of the physical properties of the polymer and the object of the present invention, the copolymer may further include a comonomer. Examples of the comonomer may include unsaturated acid anhydrides, maleimides, methyl maleimides, ethyl maleimides, butadiene, styrene and the like.

The unsaturated acid anhydride has one or more double bonds and can be used to perform radical polymerization by using the double bond. In particular, it is to be understood that even though there is no mention regarding the unsaturated organic acid monomer having one or more double bonds in the specification, the unsaturated acid anhydride has one or more double bonds unless otherwise specified. In the present invention, carboxylic acid anhydride may be used as the unsaturated acid anhydride, and monovalent or polyvalent carboxylic acid anhydride may be used. Preferably, maleic anhydride or a derivative thereof may be used, for example, the compound that is represented by the following Formula 4 may be used.

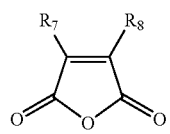
[Formula 4]

In the above Formula, $R_7$ and $R_8$ are each independently a hydrogen atom or an alkyl group having 1 to 6 carbon atoms. However, the scope of the present invention is not limited to the above examples, maleic anhydrides having different substituent groups or other types of unsaturated acid anhydrides may be used.

In the copolymer, the content of the unsaturated acid anhydride monomer is in the range of 0.1 to 40 mole %, and preferably 10 to 30 mole %. In the case of when the unsaturated acid anhydride monomer is introduced as a component of the copolymer, the copolymer has a high glass transition temperature. Thus, the copolymer may be used as the optical material. In particular, since the copolymer has many polar functional groups, the copolymer has the excellent adhesion strength in respects to metal or the like. Thus, the copolymer is useful to apply electric devices.

The copolymer may be manufactured by polymerizing the alkene monomer, the acrylate monomer, and the unsaturated organic acid monomer having one or more double bonds in the presence of the Lewis acid or the metal oxides by using a radical polymerization initiator. In the method of manufacturing the copolymer according to the present invention, the Lewis acid or the metal oxides are used to avoid a high temperature and high pressure severe condition of a known technology. Thus, the process is simple in the manufacturing method. In addition, since all of the used metal oxides may be easily recovered by using only a filtering apparatus after the polymerization and reused, the manufacturing cost can be significantly reduced, the purification can be easily performed, and the copolymer having the high purity can be provided. In addition, since stability in respects to water and air is excellent, the efficiency is high. Since the polymerization process may be simplified, the desirable industrial applicability is ensured.

The metal oxide acts as the Lewis acid that provides an acid site and is included in the Lewis acid in the polymerization reaction. However, in comparison with the typical other Lewis acids, since there are no change in the structure and the composition even after the polymerization reaction, there are additional advantages in that the separation can be easily performed and the reuse can be performed. Thus, in the present specification, for convenience of the understanding, the metal oxide is called the metal oxide or the complex metal oxide so as to be discriminated from the other typical Lewis rids.

It is preferable that the metal oxide be a compound represented by the following Formula 5.

 [Formula 5]

In Formula 5,

M is one or more selected from the group consisting of alkali earth metal, transition metal, Group 13 metal and Group 14 metal;

N is a Group 5 or 6 atom;

O is an oxygen atom; and x, y and z are values that are determined by an oxidation state of M and N with x>0, y≧0, and z>0.

To be more specific, preferable examples of the metal oxide include one or more selected from the group consisting of metal oxides such as aluminum oxide ($Al_2O_3$), yttrium oxide ($Y_2O_3$), zinc oxide ($ZrO_2$), halfnium oxide ($HfO_2$), silicon oxide ($SiO_2$), boron oxide ($B_2O_3$), cesium oxide ($CeO_2$), dysprosium oxide ($Dy_2O_3$), erbium oxide ($Er_2O_3$), europium oxide ($Eu_2O_3$), gadolinium oxide ($Gd_2O_3$), holmium oxide ($Ho_2O_3$), lanthanum oxide ($La_2O_3$), lutetium oxide ($Lu_2O_3$), neodymium oxide ($Nd_2O_3$), praseodymium oxide ($Pr_6O_{11}$), samarium oxide ($Sm_2O_3$), terbium oxide ($Tb_2O_3$), thorium oxide ($Th_4O_7$), thulium oxide ($Tm_2O_3$), ytterbium oxide ($Yb_2O_3$), tin oxide (SnO), and titanium oxide ($TiO_2$), and complex metal oxides such as dysprosium aluminate ($Dy_3Al_5O_{12}$), yttrium aluminate ($Y_3Al_5O_{12}$), aluminum titanate ($Al_2O_3.TiO_2$), aluminum silicate ($3Al_2O_3.2SiO_2$), calcium titanate ($CaTiO_3$), calcium zirconate ($CaZrO_3$), iron titanate ($FeTiO_3$), magnesium aluminate ($MgO.Al_2O_3$), cesium aluminate ($CeAl_{11}O_{18}$), $Al_2(SO_4)^3$, and $AlPO_4$.

Since the metal oxide is a solid type, the metal oxide can be completely recovered by using a physical method using only a filtering apparatus, and the recovered metal oxide can be used to perform the polymerization. The recovered metal oxide may be reused 20 times.

Preferable examples of the Lewis acid include a Lewis acid that includes one or more metal cations selected from the group consisting of scandium, titanium, vanadium, chrome, manganese, iron, cobalt, copper, zinc, boron, aluminum, yttrium, zirconium, niobium, molybdenum, cadmium, rhenium and tin, and one or more metal anions selected from the group consisting of halides, triflates, $HPO_3^{2-}$, $H_3PO^{2-}$, $CF_3COO^-$, $C_7H_{15}OSO^{2-}$ and $SO_4^{2-}$. To be more specific, preferable examples of the Lewis acid include aluminum trichloride, scandium triflate, zinc triflate, copper triflate, trifluoro boron, and a mixture thereof.

In the method of manufacturing the copolymer, it is preferable that the metal oxide or the Lewis acid be used in an amount of 0.01 to 200 mole % based on the acrylate comonomer.

Since the metal oxide or the Lewis acid is used, the content of the monomers included as the repeating unit in the manufactured copolymer can be appropriately controlled and adjusted according to the required physical properties. In particular, in the case of when the alkene monomers such as ethylene or propylene that are present in a gas phase under the reaction condition are partially dissolved in a solvent to perform the polymerization reaction, the metal oxide or the Lewis acid can control the amount of the alkene monomer required to ensure the desirable physical properties of the copolymer to be manufactured, and allow the polymerization reaction to be performed at low temperature under low pressure as compared to a known technology.

Preferable examples of the radical polymerization initiator include peroxides, azo compounds and the like. To be more specific, examples of the peroxide compound may include hydrogen peroxide, decanonyl peroxide, t-butyl peroxyneodecanoate, t-butyl peroxypivalate, 3,5,5-trimethylhexanoyl peroxide, diethyl peroxide, tbutylperoxy-2-ethyl hexanoate, t-butylperoxy isobutylate, benzoyl peroxide, tbutylperoxy acetate, t-butylperoxy benzoate, di-t-butyl peroxide, t-amylperoxy neodecanoate, t-amylperoxy pivalate, t-amylperoxy-2-ethyl hexanoate, 1,1,3,3-tetramethylbutyl hydroperoxide, alkali metal persulfate, perborate and per-carbonate, and examples of the azo compound may include 2,2'-azo-bis (isobutyronitrile) (AIBN). The preferable initiator is the azo compound. A mixture of the initiators may be used.

The radical polymerization initiator may be added to the reaction stream in an appropriate form, for example, in a pure form, in a form in which the initiator is dissolved in the appropriate solvent, and/or in a mixture form of the monomer or comonomer feed stream and the initiator. It is preferable that the radical polymerization initiator used to manufacture the copolymer be added in an amount of 0.01 to 10 mole % based on the acrylate monomer. However, the amount of the radical polymerization initiator is not limited but may vary if necessary.

It is preferable that the polymerization reaction of the copolymer be performed in the presence of a solvent, in particular, an organic solvent. Preferable examples of the solvent include one or more solvents that are selected from the group consisting of toluene, chlorobenzene, n-hexane, heptane, tetrahydrofuran, ether, methanol, ethanol, chloroform, and methylene chloride, but are not limited thereto. That is, the type of solvent is not limited as long as the solvent is capable of being used in the art to which the present invention belongs.

In the polymerization reaction, since the acrylate monomer and the unsaturated organic acid monomer are generally present in a liquid phase under the reaction condition, the acrylate monomer and the unsaturated organic acid monomer are dissolved in the solvent to be used in the polymerization reaction. Accordingly, as long as the monomers that are included in the above-mentioned copolymer are present in a liquid phase under the reaction condition, the reaction pressure is not limited.

Meanwhile, in the case of when the alkene monomer is particularly ethylene and propylene, since the alkene monomer is generally present in a gas phase under the reaction condition, in order to include the alkene monomer in the repeating unit of the copolymer according to the present invention in a predetermined amount, the high pressure reaction condition is required. However, in the case of when the alkene monomer is present in a liquid phase under the reaction condition, the reaction pressure is not limited.

Unlike a known technology that requires the severe reaction condition of the high temperature of 100° C. or more and the high pressure of 1000 atm, the polymerization reaction may be performed under the mild condition of 200 atm or less and 150° C. or less, and preferably 50 atm or less and 100° C. or less. Thus, the polymerization reaction is a simple process and it is easy to control the physical properties of the manufactured copolymer. In addition, since the metal oxide has excellent stability against moisture, the metal oxide is effective and can be reused.

Specifically, in respects to the reaction condition for polymerization of the copolymer, in the case of when the alkene monomer is present in a gas phase under the reaction condition, it is preferable that the polymerization reaction be performed under pressure in the range of 5 to 200 atm and the temperature condition in the range of 30 to 150° C. In particular, the reaction is performed under pressure in the range of 20 to 50 atm and the temperature condition in the range of 50 to 80° C.

According to an embodiment of the present invention, ethylene or propylene is used as the alkene monomer, methyl methacrylate or methyl acrylate is used as the acrylate monomer, the methacrylic acid or the acrylic acid is used as the unsaturated organic acid monomer, aluminum oxide is used as the metal oxide, and the polymerization is performed by using AIBN as the polymerization initiator under pressure in the range of 5 to 50 atm and the temperature in the range of 50 to 80° C.

Among the copolymers according to the present invention, the alkene-acrylate-acrylic acid three-membered copolymer may be manufactured by partially hydrolyzing the alkene-acrylate two-membered copolymer. The partial hydrolyzing may be performed under the reaction condition for typical hydrolysis by appropriately selecting the type of acid or base catalyst and the type of reaction media for hydrolysis. In this case, in the alkene-acrylate two-membered copolymer that is used as the raw material, the content of acrylate must be the total content of acrylate and the acrylic acid of the manufactured three-membered copolymer, and the hydrolysis condition must be controlled so that the content ratio of the monomers required in the final three-membered copolymer is obtained.

In addition, after the polymer of the alkene-acrylate-unsaturated acid anhydride according to the present invention is manufactured, the acid anhydride may be converted into the organic acid through the hydrolysis reaction in the presence of acid to manufacture the polymer. The degree of hydrolysis reaction may be controlled to manufacture a 4-membered random copolymer of the alkene monomer-acrylate monomer-organic acid monomer-acid anhydride. The polymer of the alkene-acrylate-unsaturated acid anhydride may be manufactured by using a method of manufacturing the alkene-acrylate-unsaturated organic acid copolymer.

The hydrolysis condition may include the type of acid or base catalyst, the type of reaction media, the reaction temperature, the reaction pressure, the reaction time or the like for hydrolysis, and may be appropriately selected by those who skilled in the art through an experiment method in consideration of the desirable degree of hydrolysis.

In particular, the copolymer according to the present invention may be used to manufacture an optical film. Since the optical film that includes the copolymer according to the present invention is manufactured by using the copolymer resin that has the high light transmissivity, glass transition temperature, and toughness, the optical film has the high light transmissivity, and the excellent adhesion property due to the high content of the monomer having the polar functional group. Thus, the copolymer is suitable to be used for a layered film such as a polarizing plate. Accordingly, the copolymer may be used to manufacture a retardation compensation film having the birefringence by using the stretching, a polarizing film by the postreatment using an iodine solution, and various types of optical films.

MODE FOR THE INVENTION

A better understanding of the present invention may be obtained in light of the following Examples which are set forth to illustrate, but are not to be construed to limit the present invention.

The organic agent and the solvent that were required for the polymerization were purified by using the standard method with a product of Aldrich, Co., Ltd. After highly pure ethylene that was manufactured by Applied Gas Technology, Co., Ltd. was passed through by using a water and oxygen filtering apparatus, the polymerization was performed.

In order to obtain the content of the monomer in the copolymer, the spectrum was obtained by using the 500 MHz NMR manufactured by Varian, Co., Ltd. The glass transition temperature (Tg) that was the thermal property of the obtained polymer was measured by using DSC Q100 manufactured by TA Instrument, Corp., and Td_50 (50% thermal decomposition temperature) was measured by using TGA manufactured by TA Instrument, Corp.

The molecular weight and the molecular weight distribution were obtained by using the analysis of the GPC (gel permeation chromatography) manufactured by Waters, Co., Ltd. The analysis temperature was 25° C., tetrahydrofuran (THF) was used as the solvent, and the standardization was performed by using polystyrene to obtain the number average molecular weight (Mn) and the weight average molecular weight (Mw).

Ethylene-acrylate copolymer

Comparative Example 1

After the high pressure reaction apparatus having the volume of 125 mL was vacuumized, argon was charged therein. 28 mmol of methyl methacrylate and 28 mmol of alumina were added to the reactor under the argon atmosphere. In addition, 0.084 mmol of AIBN that was the initiator dissolved in toluene was added thereto. Subsequently, ethylene was charged under 35 bar, the temperature of the reactor was increased to 75° C. and the polymerization was performed for 18 hours.

Comparative Example 2

The polymerization was performed by using the same method as Comparative Example 1, except that alumina was not added.

Figure 6:
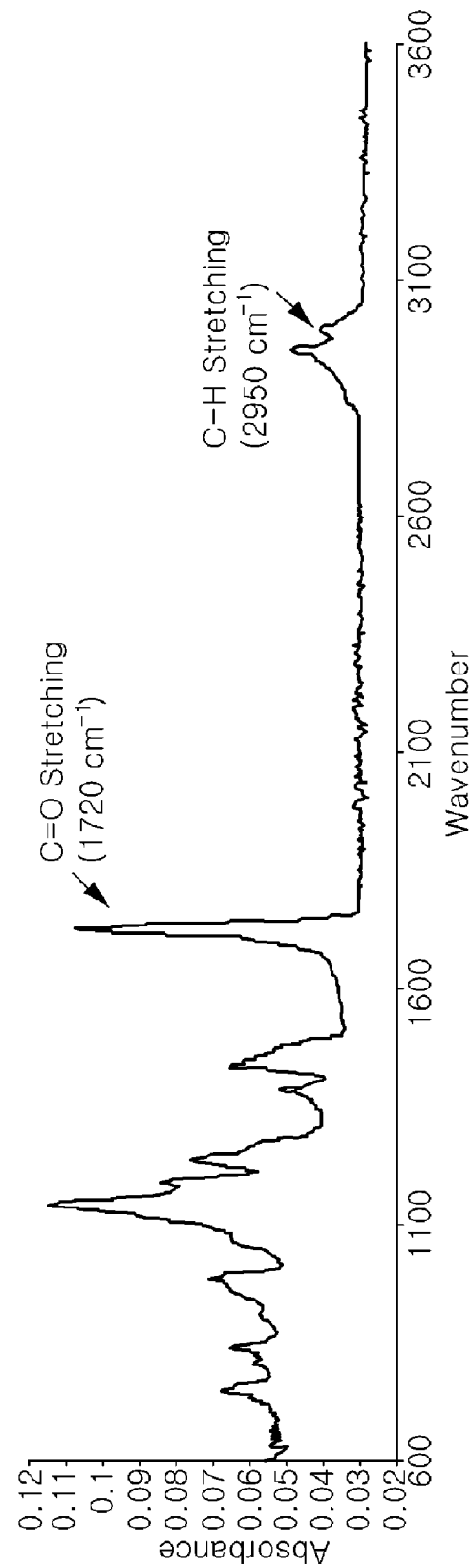
FIG. 6 illustrates an IR graph of an ethylene-methyl methacrylate copolymer that is obtained in Comparative Example 1.

The polymerization condition and the results of Comparative Example 1 and Comparative Example 2 are described in Tables 1 and 2. The NMR spectrum ($^1$H-NMR spectrum) that was the polymerization analysis result of Comparative Example 1 is shown in FIG. 1, and the IR spectrum that was the polymerization analysis result of Comparative Example 1 is shown in FIG. 6.

TABLE 1

| | Reaction addition amount | | | | Polymerization condition | |
|---|---|---|---|---|---|---|
| | [solvent]/ [monomer] | [Lewis acid]/[MMA] | [initiator]/ [monomer] | Ethylene | | |
| | (volume ratio) | (molar ratio) | (molar ratio) | pressure (bar) | Temperature (° C.) | Time (h) |
| Comparative Example 1 | 9 | 1 | 0.003 | 35 | 75 | 18 |
| Comparative Example 2 | 9 | 0 | 0.003 | 35 | 75 | 18 |

In Table 1, [monomer] means a volume or a mole number of MMA.

TABLE 2

|  | Tg (° C.) | Mn | Mw | PDI | Td_50 (° C.) | Ethylene content (mole %) |
|---|---|---|---|---|---|---|
| Comparative Example 1 | 92 | 29900 | 49000 | 1.64 | 433 | 14 |
| Comparative Example 2 | 99 | 50500 | 71700 | 1.42 | 427 | 9.7 |

In the experiment of Comparative Example 1, the ethylene-methyl methacrylate random copolymer including ethylene in a content of 14 mole % was manufactured. In Comparative Example 2, free radical polymerization was performed in a state in which alumina was not used as compared to the polymerization condition of Comparative Example 1, and the random copolymer including ethylene in a content of 9.7 mole %, which was lower than that of Comparative Example 1, was manufactured. Since the content of ethylene was reduced, the glass transition temperature was increased as compared to that of Comparative Example 1.

From the results, it can be seen that the addition of alumina increases the content of ethylene in the copolymer, and if the content of ethylene is increased, the glass transition temperature is reduced. In the two polymers, since the content of ethylene was 10 mole % or more, it is possible to manufacture the optical film having the high transparency and the excellent shapability. However, since the glass transition temperature was 100° C. or less, there is a disadvantage in that the heat resistance is undesirable to apply the polymer to the optical film. That is, when the content of ethylene is increased, the property of acrylate regarding easy breaking can be compensated to contribute to the formation of the film, but the applicability thereof is limited due to the low glass transition temperature.

1-alkene-acrylate-acrylic acid copolymer

Example 1

After the high pressure reaction apparatus having the volume of 125 mL of Parr was vacuumized, argon was charged therein. 28 mmol of methyl methacrylate (MMA), 5.6 mmol of the methacrylic acid (MAA), and 28 mmol of alumina as the Lewis acid were added to the reactor under the argon atmosphere. In addition, 0.056 mmol of AIBN that was the initiator dissolved in toluene was added thereto. Subsequently, ethylene was charged under 35 bar, the temperature of the reactor was increased to 65° C. and the polymerization was performed for 18 hours.

After the polymerization was finished, alumina was removed from the polymerization solution by using the filter, and the polymerization solution was precipitated in ethylene or hexane. The obtained polymer was dried at the temperature of Tg or less under reduced pressure for 24 hours.

Example 2

Figure 2:
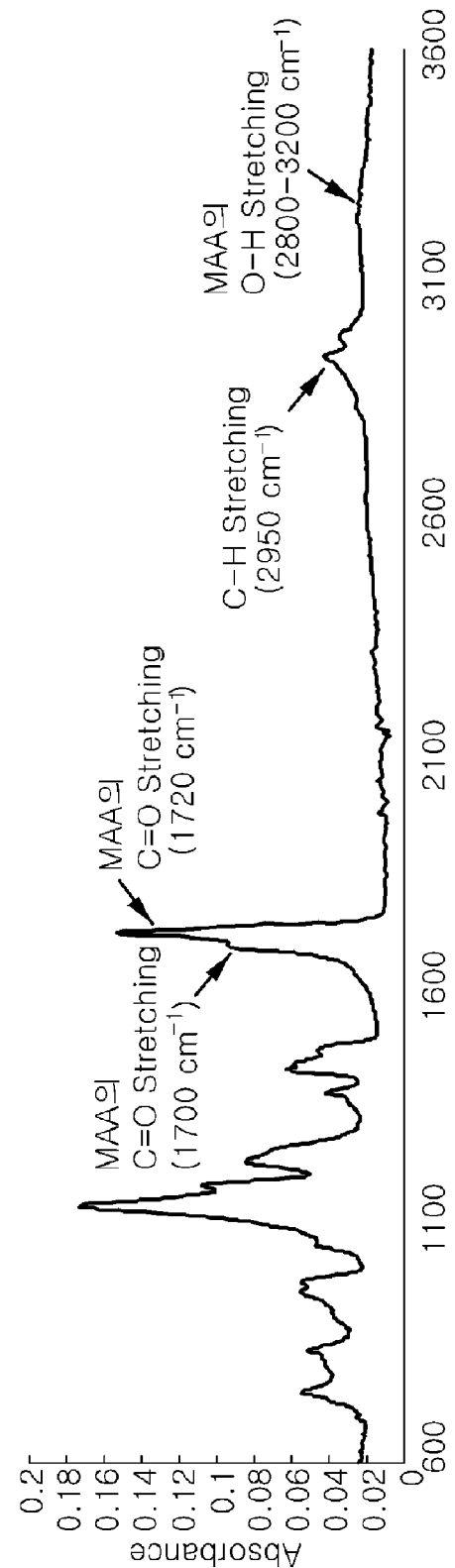
FIG. 2 illustrates IR of an ethylene-methyl methacrylate-methacrylic acid three-membered copolymer that is obtained in Example 2.

The polymerization was performed by using the same method as Example 1, except that the amount of solvent and the addition amount of MAA were controlled. The IR results of the obtained copolymer are shown in FIG. 2.

Example 3

Figure 3:
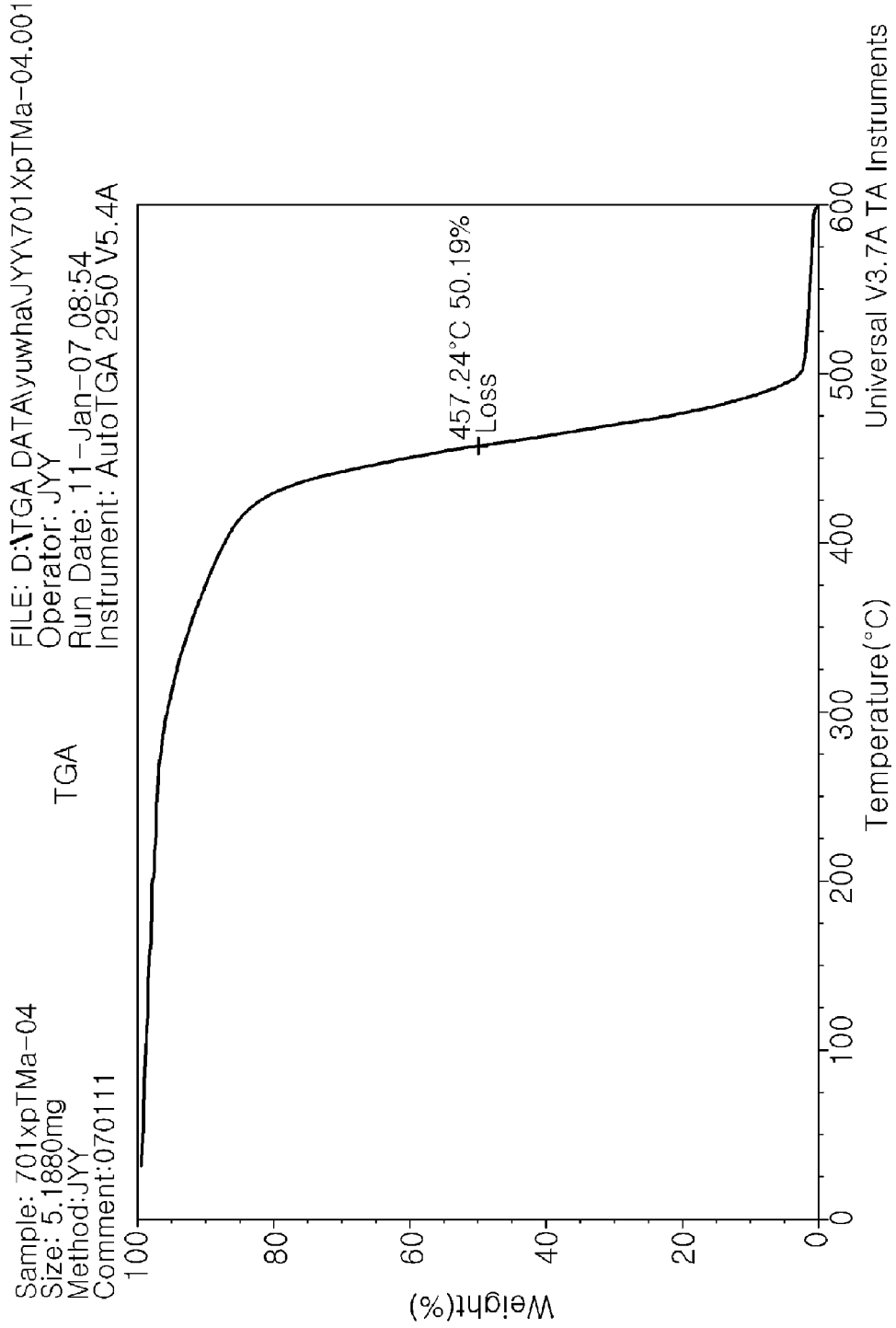
FIG. 3 illustrates the TGA results of an ethylene-methyl methacrylate-methacrylic acid three-membered copolymer that is obtained in Example 3.

The polymerization was performed by using the same method as Example 1, except that the addition amount of MAA was controlled. The TGA results of the obtained copolymer are shown in FIG. 3.

Example 4

Figure 4:
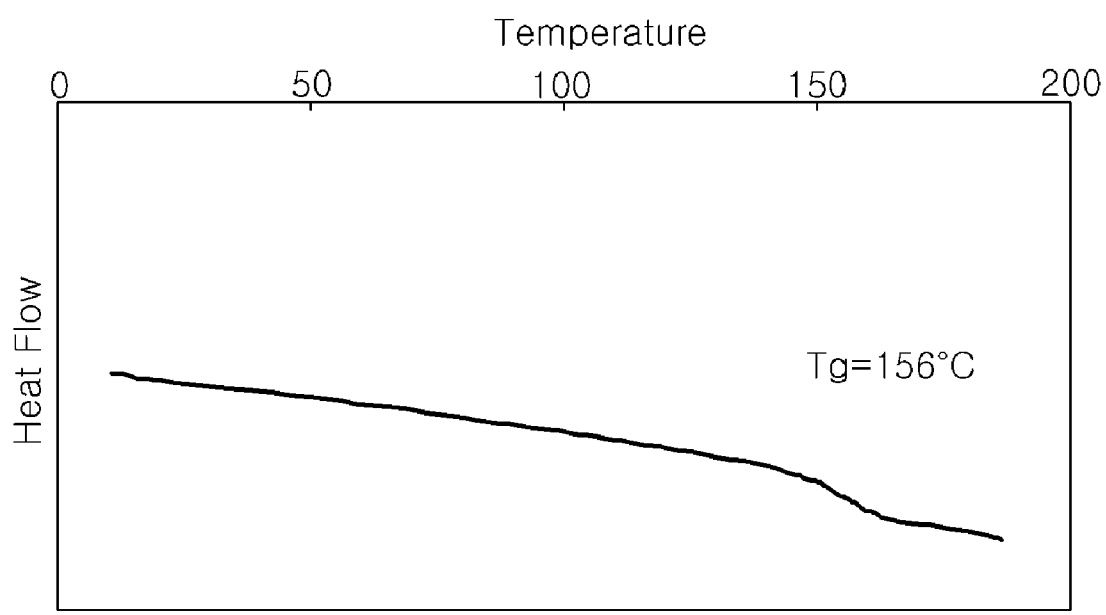
FIG. 4 illustrates a differential scanning calorimetry (DSC) graph of an ethylene-methyl methacrylate-methacrylic acid three-membered copolymer that is obtained in Example 4.
Figure 5:
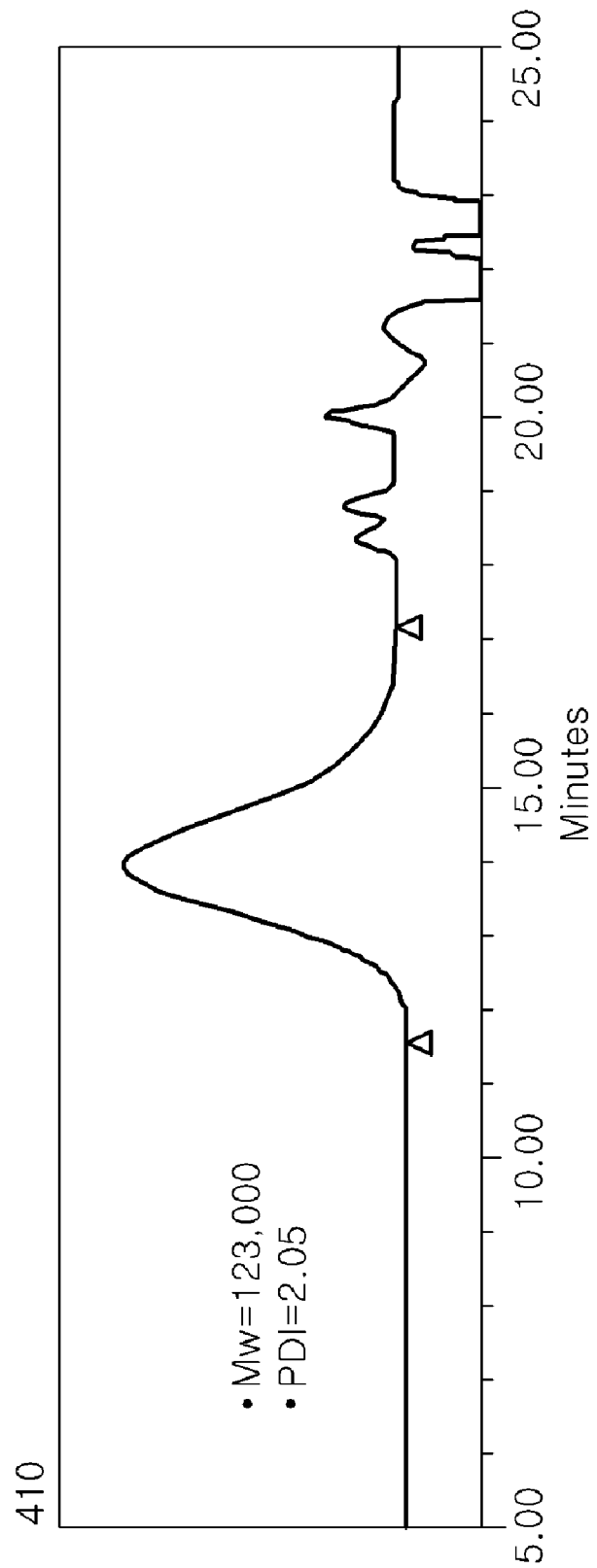
FIG. 5 illustrates the gel permeation chromatography (GPC) analysis results of an ethylene-methyl methacrylate-methacrylic acid three-membered copolymer that is obtained in Example 4.

The polymerization was performed by using the same method as Example 1, except that alumina was not added and the addition amount of MAA was controlled. The differential scanning calorimetry (DSC) graph and the gel permeation chromatography (GPC) analysis results of the obtained copolymer are shown in FIGS. 4 and 5.

In Examples 1 to 4, the ethylene-MMA-MAA three-membered copolymer that had the glass transition temperature of 140° C. or more was synthesized. The low glass transition temperature problem that was the disadvantage of the copolymer synthesized in Comparative Example was solved, and the 50% thermal decomposition temperature that was measured by using TGA was 450° C. or more which was the high temperature. Since the glass transition temperature was reduced as the content of ethylene was increased and the glass transition temperature was increased as the content of acrylic acid was increased, the polymer having desirable heat resistance and physical properties could be synthesized according to the change of the polymerization condition.

Example 5

The addition amount of MAA was reduced to 0.1 molar ratio as compared to that of MMA, and the amount of toluene that was the reaction solvent was increased. The polymerization temperature was 70° C., the concentration of the initiator was reduced 0.001 molar ratio as compared to that of monomer, and the reaction was performed for 6 hours. Alumina was used as the Lewis acid.

When the results of Example 5 and Examples 1 to 4 were compared to each other, since the content of ethylene was high, the brittleness was improved during the manufacturing of the film. Thus, the polymer was more preferable as the optical film. As compared to Comparative Example 1, even though the content of ethylene was more higher, Tg was high. The reason was that the three-membered copolymer including MAA was used. Since Tg was 121° C., the heat resistance that was capable of being used to process LCD films was ensured.

Example 6

The polymerization was performed by using the same method as Example 5, except that titanium oxide ($Ti_2O_3$) was used instead of alumina as the Lewis acid and the addition amount of the solvent was reduced.

The results of Example 6 in which titanium oxide ($Ti_2O_3$) was used were similar those of the case of when alumina was used, and various types of metal oxides were used as the Lewis acid.

Example 7

The polymerization was performed by using the same method as Example 6, except that the maleic acid that was the divalent acid was used instead of MAA that was the monovalent acid as the acrylic acid and the addition amount of the solvent was reduced.

Like the results of Example 7, the divalent acid was capable of being applied, and the desired polymer having the desirable physical properties was capable of being manufactured by controlling the addition amount.

Example 8

The polymerization was performed by using the same method as Example 7, except that maleic anhydride was used instead of the maleic acid. The obtained ethylene-methyl methacrylate-maleic anhydride three-membered random copolymer was dissolved in tetrahydrofuran, then added to the hydrogen chloride aqueous solution, and agitated at 50° C. for 24 hours to perform the reaction.

In Example 8, it was confirmed by using the IR that maleic anhydride was converted into the maleic acid that was the divalent acid by using the hydrolysis reaction in the presence of the acid. After the copolymerization was performed by using maleic anhydride, it was confirmed that the three-membered copolymer polymerization that was similar to that of Example 7 was performed by using the post reaction. The degree of hydrolysis reaction was controlled to obtain the ethylene-methyl methacrylate-maleic anhydride-maleic acid 4-membered random copolymer.

Example 9

The ethylene-methyl methacrylate copolymer that was obtained in Comparative Example 1 was subjected to the hydrolysis reaction like Example 8. A portion of the methyl methacrylate was converted into the methacrylic acid by using the hydrolysis reaction in the presence of the acid, and it was confirmed by using the IR that the hydroxyl group of the acid was formed.

As the results of Example 9, while the ethylene-methyl methacrylate-methacrylic acid three-membered copolymer was obtained, Tg and the thermal deformation temperature (Td) were increased and there was no change in the molecular weight. As described above, the three-membered copolymer can be synthesized by using the hydrolysis reaction.

The polymerization condition and the results of Examples 1 to 9 are described in Tables 3 and 4. On the other hand, the IR spectrum that was the polymerization analysis result of Example 2 is shown in FIG. 2, the TGA spectrum that was the polymerization analysis result of Example 3 is shown in FIG. 3, the DSC spectrum that was the polymerization analysis result of Example 4 is shown in FIG. 4, and the GPC spectrum that was the polymerization analysis result of Example 4 is shown in FIG. 5.

TABLE 3

| | Reaction addition amount [solvent]/[monomer] (volume ratio) | Lewis acid [alumina]/[MMA] (molar ratio) | Lewis acid [titanium oxide]/[MMA] (molar ratio) | Monomer addition amount [MAA]/[MMA] (molar ratio) | Monomer addition amount [maleic acid]/[MMA] (molar ratio) | Monomer addition amount [maleic anhydride]/[MMA] (molar ratio) | Ethylene pressure (bar) | Initiator [AIBN]/[monomer] (molar ratio) | Polymerization condition Temperature (° C.) | Polymerization condition Time (h) |
|---|---|---|---|---|---|---|---|---|---|---|
| Example 1 | 9 | 1 | — | 0.2 | — | — | 35 | 0.002 | 65 | 18 |
| Example 2 | 6 | 1 | — | 0.25 | — | — | 35 | 0.002 | 65 | 18 |
| Example 3 | 9 | 1 | — | 1 | — | — | 35 | 0.002 | 65 | 18 |
| Example 4 | 9 | — | — | 0.25 | — | — | 35 | 0.002 | 65 | 18 |
| Example 5 | 15 | 1 | — | 0.1 | — | — | 35 | 0.001 | 70 | 6 |
| Example 6 | 10 | — | 1 | 0.1 | — | — | 35 | 0.001 | 70 | 6 |
| Example 7 | 10 | 1 | — | — | 0.1 | — | 35 | 0.001 | 75 | 6 |
| Example 8 | 6 | 1 | — | — | — | 0.25 | 35 | 0.002 | 65 | 18 |
| Example 9 | 9 | 1 | — | — | — | — | 35 | 0.003 | 75 | 18 |

In Table 3, [monomer] means a volume or a mole number of MMA+MAA.

TABLE 4

| | Polymer composition ratio (mole %) | | | | Physical properties | | | | | |
|---|---|---|---|---|---|---|---|---|---|---|
| | MMA | Ethylene | MAA | Maleic acid | Tg (° C.) | Mn | Mw | PDI | Td_50 (° C.) | Transparency (%) |
| Example 1 | 63 | 11 | 26 | — | 155 | 78600 | 195000 | 2.48 | 461 | 90 |
| Example 2 | 55 | 13 | 32 | — | 146 | 61600 | 251000 | 4.08 | 456.5 | 90 |
| Example 3 | 35 | 7 | 58 | — | 181 | 88400 | 192000 | 2.17 | 457 | 89 |
| Example 4 | 57 | 2 | 35 | — | 156 | 59700 | 123000 | 2.05 | 461.9 | 90 |
| Example 5 | 64 | 23 | 13 | — | 121 | 97000 | 207000 | 2.14 | 451 | 89 |
| Example 6 | 72 | 17 | 11 | — | 128 | 81200 | 140000 | 1.72 | 442 | 91 |
| Example 7 | 67 | 15 | — | 18 | 118 | 59100 | 91500 | 1.55 | 448 | 89 |
| Example 8 | 65 | 8 | — | 27 | 123 | 96500 | 172000 | 1.78 | 400.7 | 90 |
| Example 9 | 65 | 14 | 21 | — | 151 | 26200 | 45300 | 1.73 | 452 | 89 |

Examples 10 to 13

28 mmol of methyl methacrylate (MMA), 5.6 mmol of the methacrylic acid (MAA), and 28 mmol of alumina as the Lewis acid were added to the reactor. In addition, 0.056 mmol of AIBN that was the initiator dissolved in toluene was added thereto. Subsequently, 1-alkene monomer described in the following Table 5 was added to the reactor, the temperature of the reactor was increased to 65° C. and the polymerization was performed for 18 hours.

After the polymerization was finished, alumina was removed from the polymerization solution by using the filter, and the polymerization solution was precipitated in ethylene or hexane. The obtained polymer was dried at the temperature of Tg or less under reduced pressure for 24 hours. The measured physical properties of the manufactured copolymer are described in the following Table 6.

TABLE 5

| | Reaction addition amount [solvent]/ [monomer] | Lewis acid | | Monomer addition amount | | | | Initiator [AIBN]/ [monomer] | Polymerization condition | |
|---|---|---|---|---|---|---|---|---|---|---|
| | | [alumina]/ [MMA] | [zirconium oxide]/ [MMA] | [MAA]/ [MMA] | [1-butene]/ [MMA] | [1-hexene]/ [MMA] | [1-decene]/ [MMA] | | | |
| | (volume ratio) | (molar ratio) | (molar ratio) | (molar ratio) | (molar ratio) | (molar ratio) | (molar ratio) | (molar ratio) | Temperature (° C.) | Time (h) |
| Example 10 | 9 | 1 | — | 0.1 | 5 | — | — | 0.002 | 65 | 18 |
| Example 11 | 6 | 1 | — | 0.1 | — | 3 | — | 0.002 | 65 | 18 |
| Example 12 | 9 | — | 1 | 0.1 | — | 3 | — | 0.002 | 65 | 18 |
| Example 13 | 9 | 1 | — | 0.1 | — | — | 3 | 0.002 | 65 | 18 |

In Table 5, [monomer] means a volume or a mole number of MMA+MAA.

TABLE 6

| | Polymer composition ratio (mole %) | | | Physical properties | | | | |
|---|---|---|---|---|---|---|---|---|
| MMA | 1-alkene | MAA | Tg (° C.) | Mn | Mw | PDI | Transparency (%) | |
| Example 10 | 74 | 9 | 17 | 138 | 96500 | 172000 | 1.78 | 90 |
| Example 11 | 71 | 17 | 12 | 120 | 56700 | 84000 | 1.68 | 90 |
| Example 12 | 74 | 12 | 14 | 131 | 64500 | 96600 | 1.79 | 89 |
| Example 13 | 66 | 15 | 19 | 103 | 102000 | 165000 | 1.61 | 89 |

In the case of methyl methacrylate having the highest glass transition temperature among the acrylate vinyl monomers, the glass transition temperature is generally 110° C. during the homopolymerization. In order to overcome the disadvantage of breaking of the film during the formation of the film, ethylene is added to the acrylate polymer as the comonomer. In this case, there is a problem in that the heat resistance is reduced. However, in order to endure heat during the processing, it is required that the glass transition temperature is 100° C. or more. Accordingly, the problem can be solved by adding the acrylic acid. In addition, since the acrylic acid includes the carboxylic group that was the polar group, when the acrylic acid is applied to an optical film, the adhesion property is significantly increased.

The invention claimed is:

1. A method of manufacturing a copolymer, the method comprising:
    polymerizing at least one alkene monomer in the range of 0.1 to 30 mole %, at least one acrylate monomer in the range of 30 to 99 mole % and at least one the carboxylic acid monomer in the range of 0.1 to 50 mole having one or more double bonds in the presence of a metal oxide represented by the following Formula 5 by using a radical polymerization initiator:

$$M_xN_yO_z \qquad \text{Formula 5}$$

wherein

M is one or more selected from the group consisting of alkali earth metal, transition metal, Group 13 metal and Group 14 metal;

N is a Group 5 or 6 atom;

O is an oxygen atom;

and x, y and z are values that are determined by an oxidation state of M and N with x>0, y>0, and z>0.

2. The method of manufacturing the copolymer as set forth in claim 1, wherein the metal oxide is used in an amount of 0.01 to 200 mole % based on the acrylate monomer.

3. The method of manufacturing the copolymer as set forth in claim 1, wherein the radical polymerization initiator is used in an amount of 0.01 to 1 mole % based on the acrylate monomer.

4. The method of manufacturing the copolymer as set forth in claim 1, wherein the polymerizing is performed under pressure in the range of 20 to 5 atm and the temperature in the range of 50 to 80° C.

* * * * *

UNITED STATES PATENT AND TRADEMARK OFFICE
CERTIFICATE OF CORRECTION

PATENT NO. : 7,943,709 B2  Page 1 of 1
APPLICATION NO. : 12/593953
DATED : May 17, 2011
INVENTOR(S) : Byoung-Ho Jeon et al.

It is certified that error appears in the above-identified patent and that said Letters Patent is hereby corrected as shown below:

Column 18, Line 6, please delete "the" between "one" and "carboxylic".
Column 18, Line 7, please Insert --%-- between "mole" and "having".

Signed and Sealed this
Thirtieth Day of October, 2012

David J. Kappos
*Director of the United States Patent and Trademark Office*